United States Patent
Pal et al.

(10) Patent No.: US 8,182,223 B2
(45) Date of Patent: May 22, 2012

(54) TURBINE BLADE COOLING

(75) Inventors: Dipankar Pal, Greenville, SC (US); James E. Thompson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 12/394,486

(22) Filed: Feb. 27, 2009

(65) Prior Publication Data

US 2010/0221123 A1   Sep. 2, 2010

(51) Int. Cl.
B63H 1/14 (2006.01)
(52) U.S. Cl. .............. 416/96 A; 416/97 R; 415/115
(58) Field of Classification Search ............. 416/97 R, 416/96 A, 227 R, 232; 415/115
See application file for complete search history.

(56) References Cited

U.S. PATENT DOCUMENTS

| | | | |
|---|---|---|---|
| 5,363,654 A | 11/1994 | Lee | |
| 5,480,281 A | 1/1996 | Correia | |
| 6,733,229 B2 | 5/2004 | Burdgick et al. | |
| 7,497,655 B1* | 3/2009 | Liang | 415/1 |
| 7,556,476 B1* | 7/2009 | Liang | 416/97 R |
| 7,871,246 B2* | 1/2011 | Liang | 416/97 R |
| 2004/0009066 A1* | 1/2004 | Soechting et al. | 416/96 R |
| 2006/0257257 A1* | 11/2006 | Deschamps et al. | 416/97 R |
| 2007/0243065 A1* | 10/2007 | Devore et al. | 416/97 R |
| 2007/0280832 A1* | 12/2007 | Liang | 416/97 R |

* cited by examiner

*Primary Examiner* — Matthew Landau
*Assistant Examiner* — Joseph C Nicely
(74) *Attorney, Agent, or Firm* — Mark E. Henderson; Ernest G. Cusick; Frank A. Landgraff

(57) ABSTRACT

A turbine blade with a generally hollow airfoil having an outer wall that defines at least one radially extending chamber for receiving the flow of a coolant, the airfoil including a leading edge that resides in an upstream or forward direction, a trailing edge that resides in a downstream or aft direction, a convex suction side, and a concave pressure side, the turbine blade comprising: a plurality of inserts disposed within the chamber that are configured to initially receive at least a portion of the coolant entering the chamber and direct a substantial portion of the coolant through a plurality of insert apertures toward the inner surface of the outer wall; wherein the inserts are configured to form at least one inward bleed channel and a central collector passage into which the inward bleed channel flows.

21 Claims, 7 Drawing Sheets

TURBINE BLADE COOLING

BACKGROUND OF THE INVENTION

This present application relates generally to apparatus, methods and/or systems for improving the efficiency and/or operation of turbine engines. More specifically, but not by way of limitation, the present application relates to apparatus, methods and/or systems for cooling turbine airfoils via the circulation and impingement of a coolant through internal cooling circuits or passageways.

A gas turbine engine typically includes a compressor, a combustor, and a turbine. (Note that although the present invention is described primarily in reference to an exemplary power generating gas turbine engine, it is not so limited, and this reference is provided only as an example. A person of ordinary skill in the art will appreciate that embodiments of the present invention also may be used in aircraft engines and other types of rotary engines.) The compressor and turbine generally include rows of turbine blades or airfoils that are axially stacked in stages. Each stage may include alternating rows of circumferentially-spaced stator blades, which are fixed, and rows of circumferentially spaced rotor blades, that rotate about a central axis or shaft. In operation, the rotor blades in the compressor rotate about the shaft to compress a flow of air. The supply of compressed air then is used in the combustor to combust a supply of fuel. The resulting flow of hot gases from the combustion then is expanded through the turbine section of the engine, which induces the turbine rotor blades to rotate. With the rotor blades being connected to a central shaft, the rotation of the rotor blades induces the shaft to rotate.

In this manner, the energy contained in the fuel is converted into the mechanical energy of the rotating shaft, which may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, turbine airfoils, which, as described, generally include the rotating rotor blades and the fixed, circumferentially-spaced stator blades, become highly stressed with extreme mechanical and thermal loads.

The objective of designing and building more efficient turbine engines is a significant one, particularly considering the growing scarcity and increasing cost of fossil fuels. While several strategies for increasing the efficiency of turbine engines are known, it remains a challenging goal because the known alternatives, which, for example, include increasing the size of the engine, increasing the temperatures through the hot-gas path, and increasing the rotational velocities of the rotor blades, generally place additional strain on parts, including additional strain on turbine airfoils, which are already highly stressed. As a result, improved apparatus, methods and/or systems that reduce operational stresses placed on turbine airfoils or allow the turbine airfoils to better withstand these stresses are in great demand.

As one of ordinary skill in the art will appreciate, one strategy for alleviating thermal stresses is through cooling the airfoils such that the temperatures experienced by the airfoils are lower than that of the hot-gas path. Effective cooling may, for example, allow the airfoils to withstand higher firing temperatures, withstand greater mechanical stresses at high operating temperatures, and/or extend the part-life of the airfoil, all of which may allow the turbine engine to be more cost-effective and efficient. One way to cool airfoils during operation is through the use of internal cooling passageways or circuits. Generally, this involves passing a relatively cool supply of compressed air, which may be supplied by the compressor of the turbine engine, through internal cooling circuits within the airfoils. As the compressed air passes through the airfoil, it convectively cools the airfoil, which may allow the part to withstand firing temperatures that it otherwise could not.

In some instances, the supply of compressed air is released through small holes on the surface of the airfoils. Released in this manner, the supply of air forms a thin layer or film of relatively cool air at the surface of the airfoil, which both cools and insulates the part from the higher temperatures that surround it. This type of cooling, which is commonly referred to as "film cooling," however, comes at an expense. The release of the compressed air in this manner over the surface of the airfoil, lowers the aero-efficiency of the engine. Better strategies that enhance the internal cooling through the airfoil such that, for example, film cooling could be minimized or reduced would generally increase the efficiency of the turbine engine. As a result, there is an ongoing need for improved cooling strategies for turbine airfoils.

BRIEF DESCRIPTION OF THE INVENTION

The present application thus describes a turbine blade with a generally hollow airfoil having an outer wall that defines at least one radially extending chamber for receiving the flow of a coolant, the airfoil including a leading edge that resides in an upstream or forward direction, a trailing edge that resides in a downstream or aft direction, a convex suction side, and a concave pressure side, the turbine blade comprising: a plurality of inserts disposed within the chamber that are configured to initially receive at least a portion of the coolant entering the chamber and direct a substantial portion of the coolant through a plurality of insert apertures toward the inner surface of the outer wall; wherein the inserts are configured to form at least one inward bleed channel and a central collector passage into which the inward bleed channel flows.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
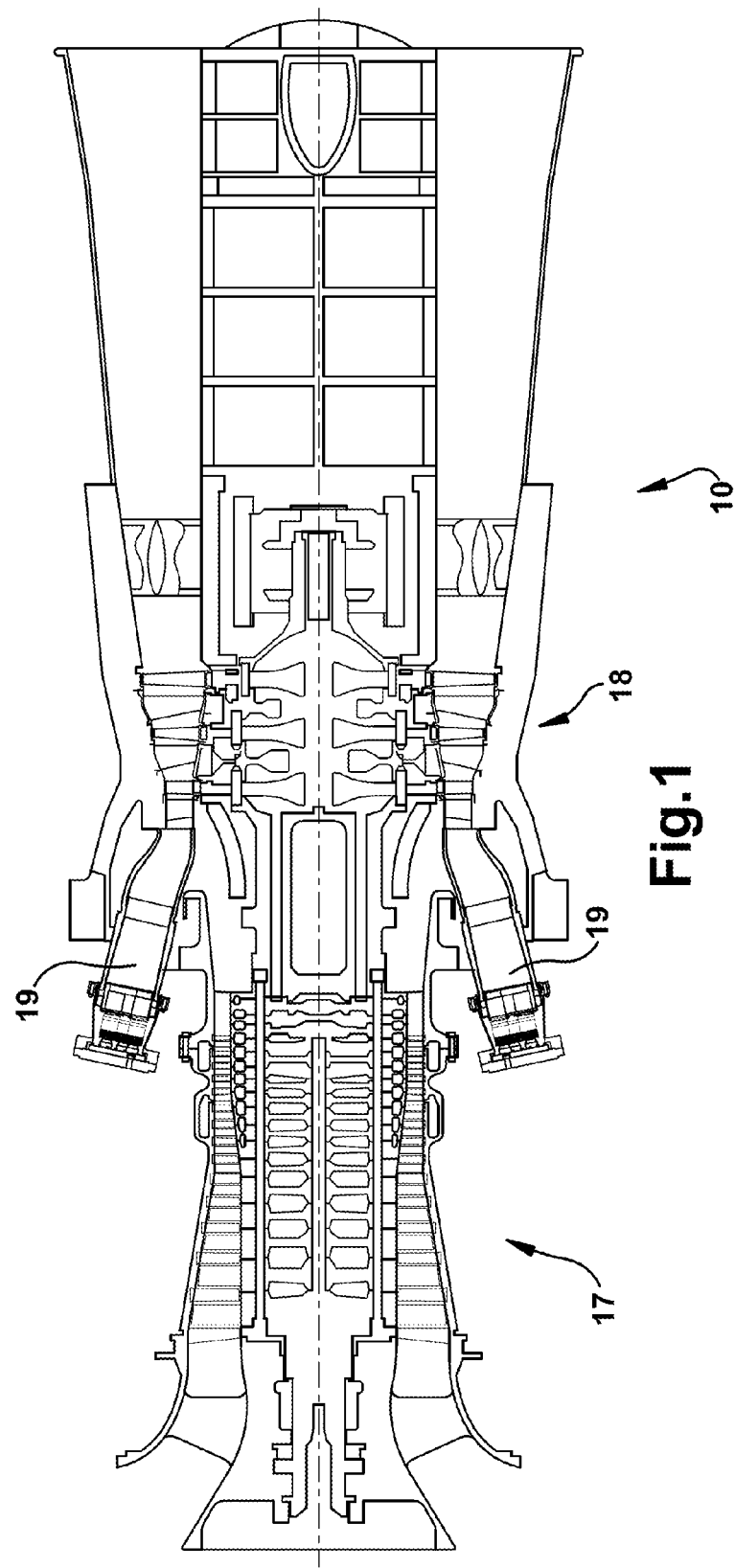
FIG. 1 is a schematic representation of an exemplary turbine engine in which embodiments of the present application may be used.

Referring now to the figures, FIG. 1 illustrates a schematic representation of a gas turbine engine 10. In general, gas turbine engines operate by extracting energy from a pressurized flow of hot gas that is produced by the combustion of a fuel in a stream of compressed air. As illustrated in FIG. 1, gas turbine engine 10 may be configured with an axial compressor 17 (though other types of compressors are possible) that is mechanically coupled by a common shaft or rotor to a downstream turbine section or turbine 18, and a combustor 19 positioned between the compressor 19 and the turbine 18. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
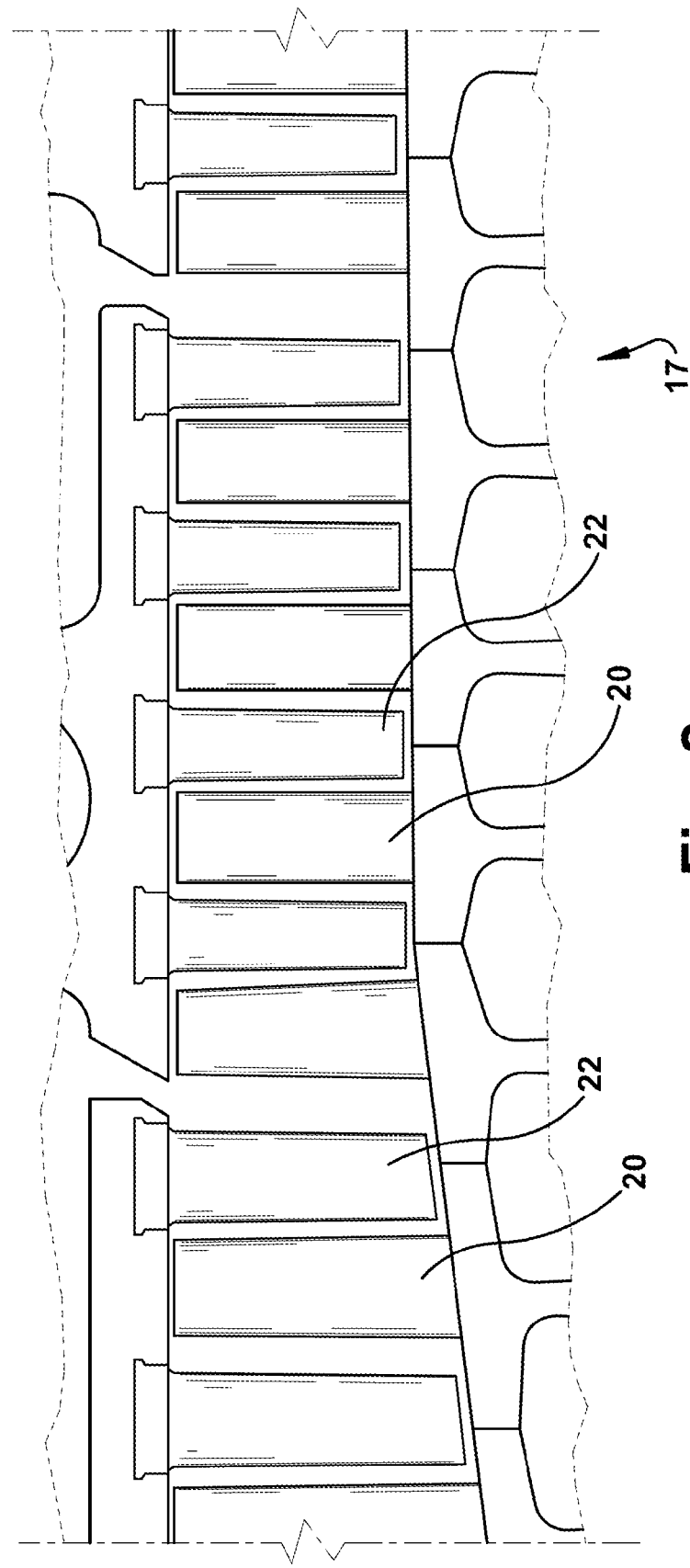
FIG. 2 is a sectional view of a compressor in a gas turbine engine in which embodiments of the present application may be used.

FIG. 2 illustrates a view of an exemplary multi-staged axial compressor 17 that may be used in a gas turbine engine 10. As shown, the compressor 17 may include a plurality of stages. Each stage may include a row of compressor rotor blades 20 followed by a row of compressor stator blades 22. Thus, a first stage may include a row of compressor rotor blades 20, which rotate about a central shaft, followed by a row of compressor stator blades 22, which remain stationary during operation. The compressor stator blades 22 generally are circumferentially spaced one from the other and fixed about the axis of rotation. The compressor rotor blades 20 are circumferentially spaced and attached to the shaft such that when the shaft rotates during operation, the compressor rotor blades 20 rotate about it. As one of ordinary skill in the art will appreciate, the compressor rotor blades 20 are configured such that, when spun about the shaft, they impart kinetic energy to the air or working fluid flowing through the compressor 17. The compressor 17 may have many other stages beyond the stages that are illustrated in FIG. 2. Additional stages also may include a plurality of circumferential spaced compressor rotor blades 20 followed by a plurality of circumferentially spaced compressor stator blades 22.

Figure 3:
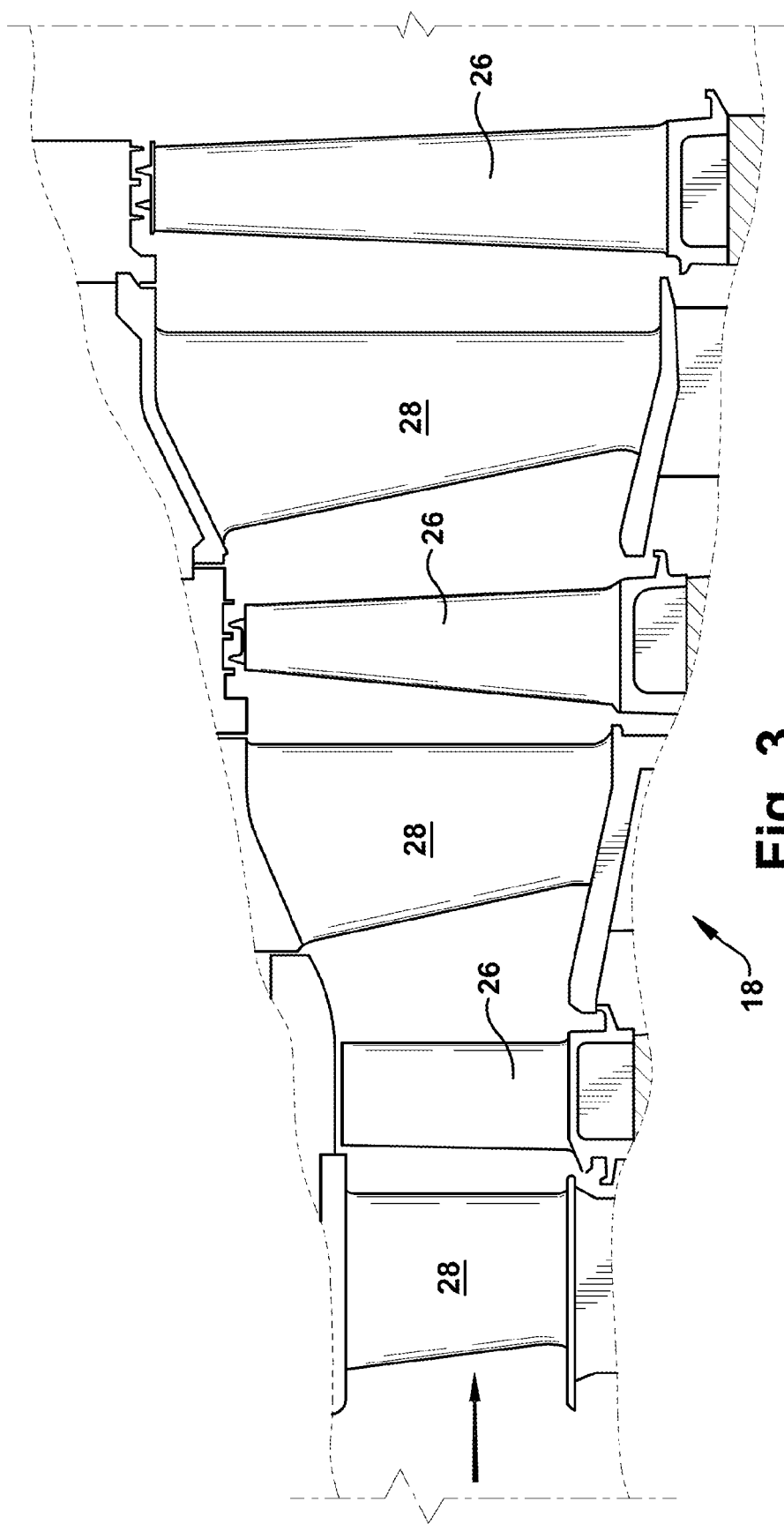
FIG. 3 is a sectional view of a turbine in a gas turbine engine in which embodiments of the present application may be used.

FIG. 3 illustrates a partial view of an exemplary turbine section or turbine 18 that may be used in the gas turbine engine 10. The turbine 18 also may include a plurality of stages. Three exemplary stages are illustrated, but more or less stages may be present in the turbine 18. Each stage may include a plurality of turbine buckets or turbine rotor blades 26, which rotate about the shaft during operation, and a plurality of nozzles or turbine stator blades 28, which remain stationary during operation. The turbine stator blades 28 generally are circumferentially spaced one from the other and fixed about the axis of rotation. The turbine rotor blades 26 may be mounted on a turbine wheel (not shown) for rotation about the shaft (not shown). It will be appreciated that the turbine stator blades 28 and turbine rotor blades 26 lie in the hot gas path of the turbine 18. The direction of flow of the hot gases through the hot gas path is indicated by the arrow.

Note that as used herein, reference, without further specificity, to "rotor blades" is a reference to the rotating blades of either the compressor 17 or the turbine 18, which include both compressor rotor blades 20 and turbine rotor blades 26. Reference, without further specificity, to "stator blades" is a reference to the stationary blades of either the compressor 17 or the turbine 18, which include both compressor stator blades 22 and turbine stator blades 28. The term "blades" will be used herein to refer to either type of blade. Thus, without further specificity, the term "blades" is inclusive to all type of turbine engine blades, including compressor rotor blades 20, compressor stator blades 22, turbine rotor blades 26, and turbine stator blades 28.

In use, the rotation of compressor rotor blades 120 within the axial compressor 17 may compress a flow of air. In the combustor 19, energy may be released when the compressed air is mixed with a fuel and ignited. The resulting flow of hot gases from the combustor 19 then may be directed over the turbine rotor blades 26, which may induce the rotation of the turbine rotor blades 26 about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades 20, such that the necessary supply of compressed air is produced, and also, for example, a generator to produce electricity.

As one of ordinary skill in the art will appreciate, often turbine blades, i.e., both turbine rotor blades and turbine stator blades, are cooled by circulating compressed air bled from the compressor through hollow passages formed therein. (Note that the following examples provided in FIGS. 4-7, at times, are discussed as if the airfoil configuration is used in a turbine rotor blade. Those of ordinary skill in the art will appreciate that this is exemplary only and that hollow airfoils of the same general configuration may be used in turbine stator blades or other types of blades.) Turbine rotor blades generally include an airfoil that extends radially from a base or root portion. The airfoil generally includes a concave pressure sidewall or pressure side and a circumferentially or laterally opposite, convex suction sidewall or suction side. Both the pressure side and the suction side extend axially between a leading edge and a trailing edge. The pressure side and the suction side further extend in the radial direction between the radially inner root and a radially outer blade tip, and define a hollow chamber therebetween, through which the compressed air coolant may be circulated.

Figure 4:
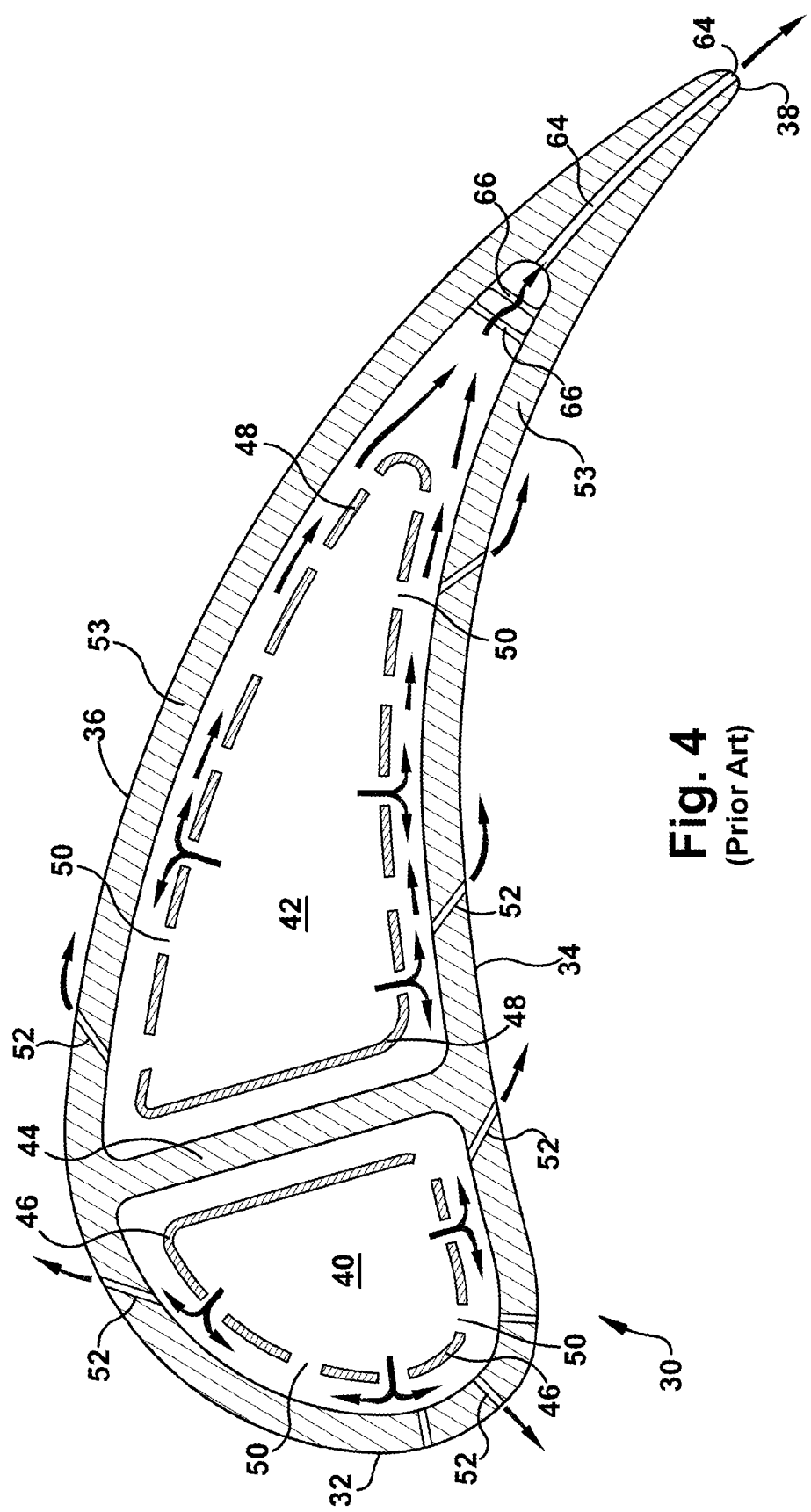
FIG. 4 is a cross sectional view of a conventional air-cooled airfoil.

Referring back to the figures, FIG. 4 illustrates a section view of a conventional air-cooled airfoil 30 that may be used in several types of turbine blades. As shown, the airfoil 30 includes an overall airfoil shape, and has a nose or leading edge 32, a pressure side 34, a suction side 36, and a trailing edge 38. The airfoil 30 is generally hollow and, often, is divided into multiple chambers, which, as shown, might include two radially extending internal chambers 40, 42 divided by an intermediate partition 44 and defined by an outer wall 53. Generally, each internal chamber 40, 42 encloses a hollow radially extending insert 46, 48 having a configuration that conforms to the internal contour of the respective chamber but in spaced relation thereto. The inserts 46, 48 contain insert apertures 50 in preselected locations. High pressure cooling air from the turbine compressor is directed into the inserts per conventional means through the base or root of the airfoil, and is exhausted through such apertures to form jets of air striking the inner walls of the chambers 40, 42 for impingement cooling (as shown by the arrows). The insert apertures 50, for example, may be disposed along a plurality of rows that extend from an inner radial position on the inserts 46, 48 to an outer radial position on the inserts 46, 48. The central idea of this technique is the use of the high heat transfer coefficient (HTC) caused by discrete jet impingement of high velocity coolant on a hot metallic surface to convect away the heat from the target surface.

More particularly, the insert apertures 50 of insert 46 in the leading edge chamber 40 are located to impinge on the inner surface of the outer wall 53 opposite the insert 46. The cooling air forced into the leading edge chamber 40 and through the insert 46 is exhausted through radially spaced rows of film cooling apertures 52 that pass through the outer wall 53 of the airfoil. This exhausted cooling air provides a layer of boundary air adjacent the exterior surfaces of the airfoil that inhibits heat transfer to the airfoil from the working fluid. The cooling air forced into the trailing edge insert 48 exits through insert apertures 50, which also are located to impinge on the inner surface of the outer wall 53 opposite the insert 48. Afterward, the coolant is exhausted from the trailing edge chamber 42 either through film cooling apertures 52 or through trailing edge cooling apertures 64, which extend from the trailing edge chamber 42 to the trailing edge 38 of the airfoil. In some airfoils, as shown, a plurality of rows of generally cylindrical pins 66 may extend across a space that resides between the trailing edge chamber 42 and the trailing edge cooling aperture 64.

Using the coolant in this manner, i.e., injecting the flow into the confined channel bound by the inner surface of the outer wall 53 and the impingement insert 46, 48, degrades its effectiveness. This degradation is caused by the cross-flow of post-impingement fluid that is driven in the direction of favorable pressure gradients within the airfoil cavity. That is, conventional impingement cooled airfoil designs are disadvantaged by post-impingement cross-flow degradation effects.

For example, cooling fluid that exits insert apertures 50 in the trailing edge chamber 42 is deflected first by the inner surface of the outer wall 53, where the flow convects heat away from the outer wall 53. Much of the flow then proceeds toward favorable pressure gradients, which generally means the flow proceeds to the trailing edge 38 of the airfoil 30 where it exits through the trailing edge cooling aperture 64. Generally, a smaller portion of the flow proceeds to the film cooling apertures 52 where it is discharged. Given the general flow patterns of conventional hollow airfoils, as shown in FIG. 4, a significant portion of the coolant flow crosses in front of other insert apertures 50 (i.e., between the insert aperture 50 and the opposing section of outer wall 53) as the flow moves toward exit points. Because of the heat already absorbed from the outer wall 53, the post-impingement cross-flow generally has a higher temperature than pre-impingement coolant (i.e., coolant before being impinged and directed against the outer wall 53). As one of ordinary skill in the art will appreciate, the post-impingement cross flow impedes cooling of the outer wall 53 by mixing with the fresh coolant, thereby reducing the temperature differential between the outer wall 53 and flow against it. In addition, degradation occurs through jet-vector alteration. That is, the cross flow alters the direction of the impinged coolant from the insert apertures so that the jet does not strike the target surface in a perpendicular manner, which decreases its cooling effectiveness.

On the other hand, if the post-impingement flow were reduced within the channel defined by the insert 46, 48 and the outer wall 53 such that it did not impede fresh coolant from flowing directly against the outer wall 53, the heat exchange between the fluid coolant and the outer wall 53 would be improved. As one of ordinary skill in the art will appreciate, such an improvement in cooling effectiveness would reduce the amount of coolant required to maintain the airfoils at an appropriate or desired temperature. As the use of coolant air has a negative impact on efficiency, a reduction in its use would increase the efficiency of the turbine engine.

Figure 5:
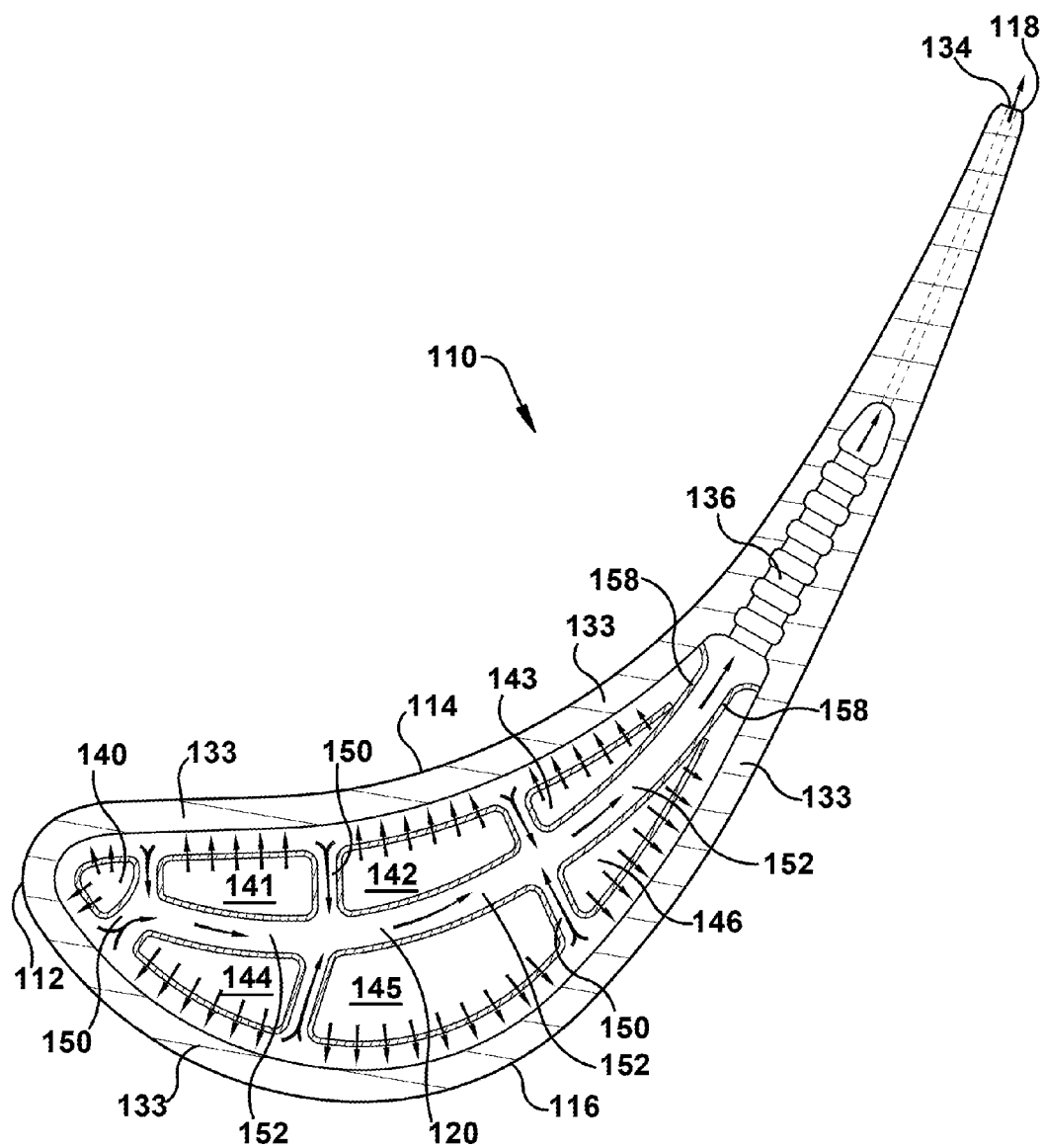
FIG. 5 is a cross-sectional view of an airfoil illustrating internal cooling circuits and an insert according to an exemplary embodiment of the present application.
Figure 6:
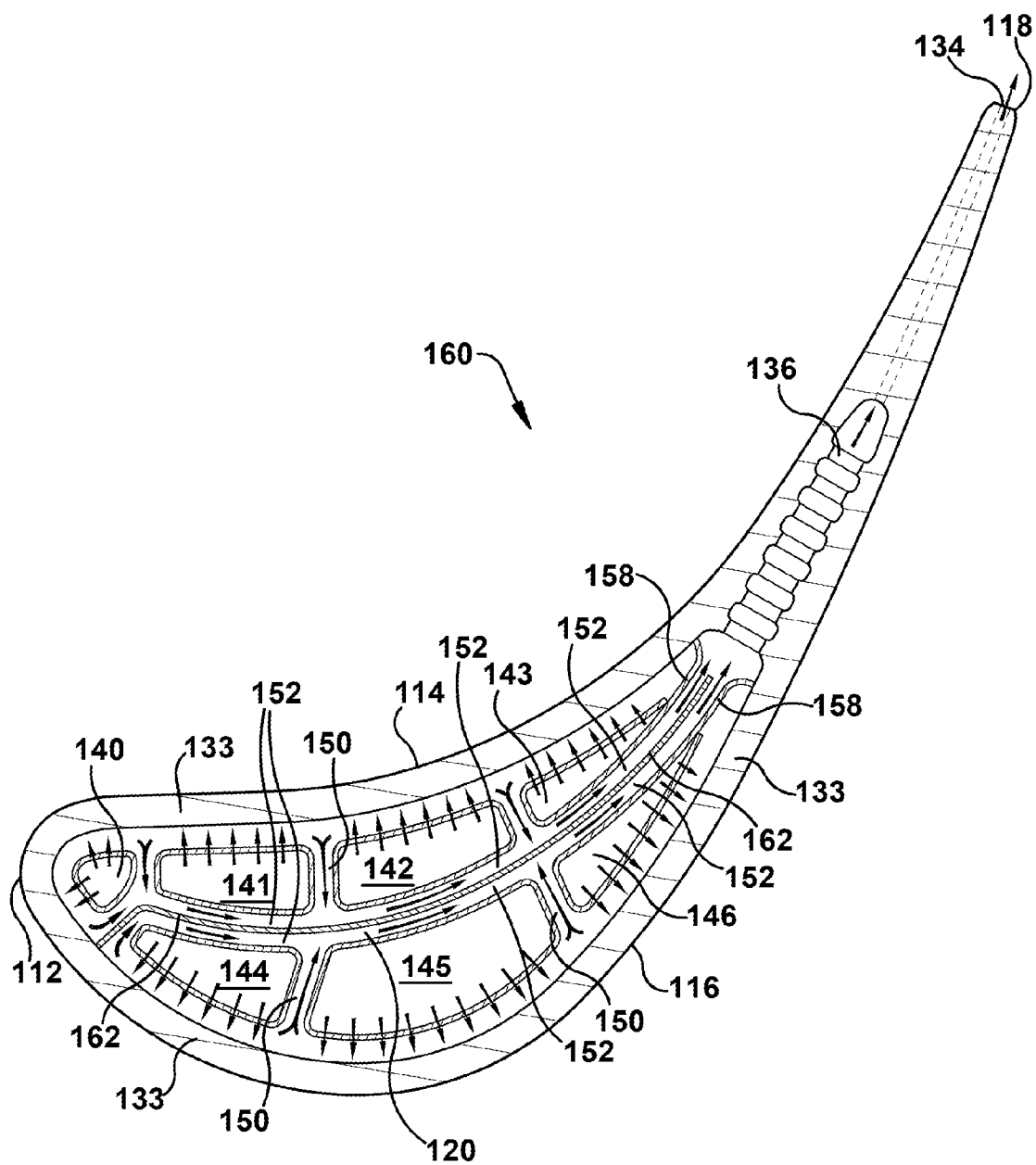
FIG. 6 is a cross-sectional view of an airfoil illustrating internal cooling circuits and an insert according to an exemplary embodiment of the present application.
Figure 7:
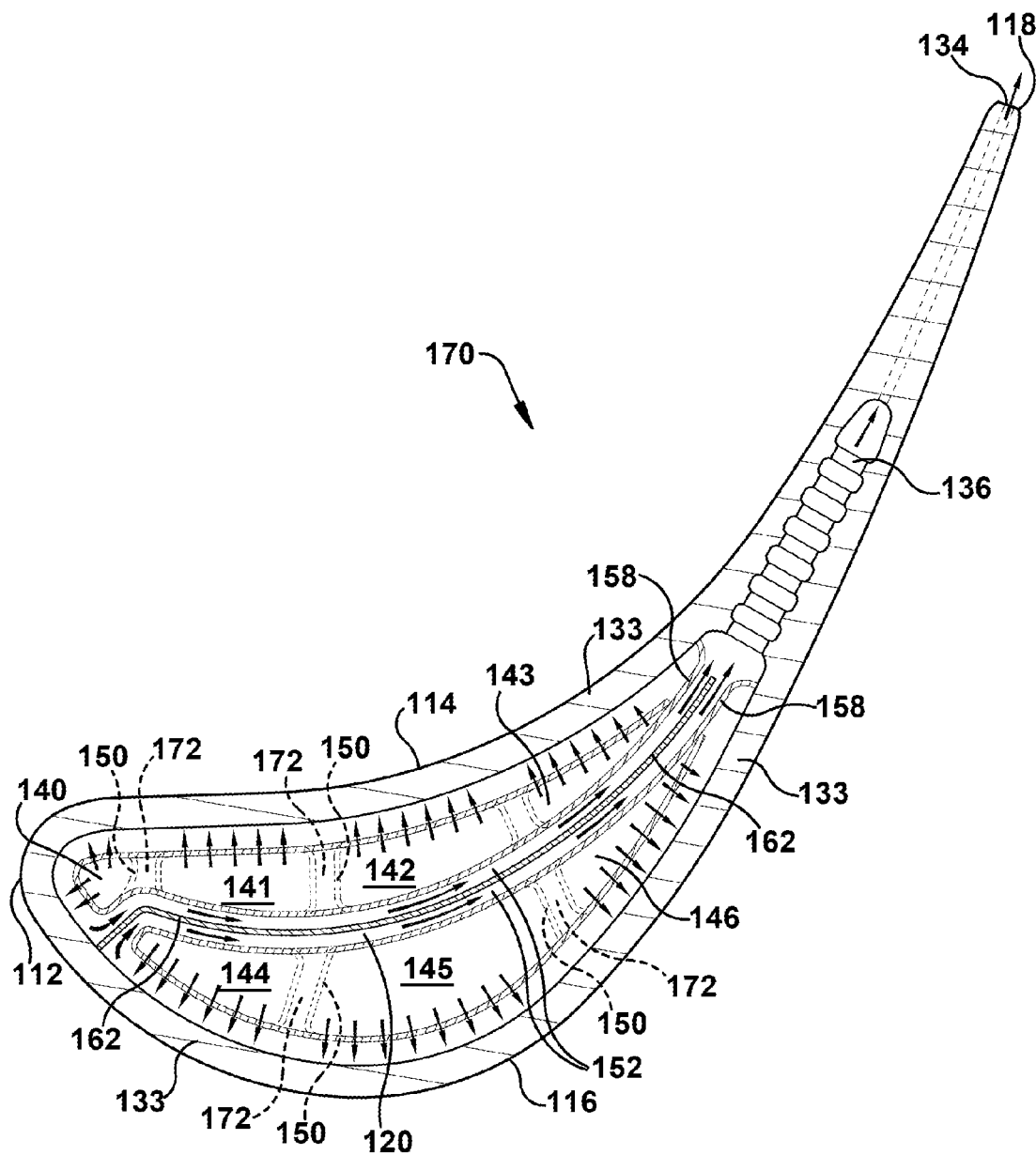
FIG. 7 is a cross-sectional view of an airfoil illustrating internal cooling circuits and an insert according to an alternative embodiment of the present application.

Referring now to FIG. 5, a cross-sectional view of an airfoil 110 illustrating internal cooling circuits/inserts according to an exemplary embodiment of the present application is shown. As stated, hollow airfoils having configurations corresponding to the present invention may be used in either stator blades or rotor blades. For the sake of clarity and brevity, the embodiments of FIGS. 5-7 are provided with some described details that are applicable to usage in rotor blades. As one of ordinary skill in the art will appreciate, this is exemplary only and not meant to be limiting in any way. The airfoil 110 generally has an airfoil shaped configuration, having a forward or leading edge 112, a pressure side 114, a suction side 116 and an aft or trailing edge 118. The airfoil has a radially extending central chamber 120, which generally takes the shape of the airfoil and is defined by a relatively thin outer wall 133. (Note, as shown in FIG. 5, the central chamber 120 is not divided into a plurality of chambers as the example in FIG. 4 was divided into a leading edge chamber 40 and trailing edge chamber 42. This is exemplary of a preferred embodiment of the present application. In other embodiments, the central chamber 120 may be divided into multiple chambers and inserts consistent with those described herein may be used in one or all of those chambers.) Similar to the prior art example shown above in FIG. 4, film cooling apertures may be present through the outer wall 133, however, for the sake of simplicity, these are not shown in FIGS. 5-7. The airfoil 110 may further include trailing edge cooling apertures 134 and pins 136 that are similar to those same features described above, though these features are not critical.

A plurality of radially extending inserts 140, 141, 142, 143, 144, 145, 146, as shown in FIG. 5, may be included in exemplary embodiments of the present application. As used herein, an "insert" refers to the partitions that are installed within hollow airfoils (i.e., generally an insert is not integrally formed with the airfoil as a single part) to direct a flow of coolant that is introduced at one end of the blade and impinge the flow into a plurality of cooling jets aimed against the inner surface of the outer wall of the airfoil. Generally, inserts are thin-walled radially extending partitions that generally forms compartments within the chamber and may be made of sheet metal, cast metal, ceramic materials, or other suitable materials. Properly installed, an insert generally has an inlet positioned at one end of the blade for the fluid coolant to enter and defines a hollow cavity that directs the flow of coolant in a radial direction. An insert generally has a plurality of evenly dispersed insert apertures that discharge the coolant against the outer wall of the airfoil. The insert apertures are sized such that they impinge the flow of coolant and, thereby, increase its cooling effectiveness. The inserts of the exemplary embodiment of FIG. 5 include a nose insert 140 (which may be considered either a suction side insert and/or a pressure side insert), a plurality of pressure side inserts 141, 142, 143 (which may include a forward pressure side insert 141, a middle pressure side insert 142, and an aft pressure side insert 143), and a plurality of suction side inserts, 144, 145, 146 (which may include a forward suction side insert 144, a middle suction side insert 145, and an aft suction side insert 146). The several inserts of FIG. 5, as described in more detail below, may be configured and positioned to define inward bleed channels 150 and a central collector passage 152. Each insert generally has an outer face or wall that opposes the inner surface of the outer wall 133, through which insert apertures are formed that direct the coolant against the outer wall 133. This wall of the insert generally conforms to the internal contour of the respective section of outer wall 133, but in spaced relation thereto. Note that, unlike the prior art example of FIG. 4, the positioning of the insert apertures of the examples shown in FIGS. 5-7 are indicated by the several arrows that extend through the wall of the insert.

The inward bleed channels 150 are channels defined by the spacing between and shape of neighboring inserts. In general, inward bleed channels 150 extend from the exterior of the central chamber 120 to the central region of the central chamber 120, where they connect to the central collector passage 152. In preferred embodiments, the inward bleed channels 150 are oriented in a direction that is roughly perpendicular to a mid-chord line of the airfoil. As one of ordinary skill in the art will appreciate, the mid-chord line is a reference line (not shown) extending from the leading edge 112 to the trailing edge 118 that connects the approximate midpoints between the pressure side 114 and the suction side 116. Further, in preferred embodiments, the inward bleed channels 150 are oriented in a direction that is roughly perpendicular to central collector passage 152. The inward bleed channels 150 generally begin at a position near the outer wall 133 and terminate at a position near the mid-chord line.

The inward bleed channels 150, as illustrated in the exemplary preferred embodiment of FIG. 5, may be disposed between the nose insert 140 and the forward pressure side insert 141, between the forward pressure side insert 141 and the middle pressure side insert 142, between the middle pressure side insert 142 and the aft pressure side insert 143, between the nose insert 140 and the forward suction side insert 144, between the forward suction side insert 144 and the middle suction side insert 145, and between the middle suction side insert 145 and the aft suction side insert 146. In preferred embodiments, there will generally be at least two inserts on the pressure side 114 of the central chamber 120, which define at least one inward bleed channel 150, and at least two inserts on the suction side 116 of the central chamber 120, which define at least one inward bleed channel 150, with the space maintained between the pressure side inserts 141, 142, 143 and the suction side inserts 144, 145, 146 forming the central collector passage 152.

The opposing walls of neighboring inserts may be approximately parallel and separated by the width of the channel formed therebetween. Accordingly, in a preferred embodiment, the opposing walls of each pair of pressure side inserts 141, 142, 143 may be approximately parallel and offset by the desired width of the inward bleed channels 150 formed therebetween. Thus, for example, an aft wall of the forward pressure side insert 141 may be approximately parallel to a forward wall of the middle pressure side insert 142. The opposing walls of each pair of suction side inserts 144, 145, 146 similarly may be approximately parallel and offset by the desired width of the inward bleed channels 150 formed therebetween. Thus, for example, an aft wall of the forward suction side insert 144 may be approximately parallel to a forward wall of the middle suction side insert 145. A similar relationship may be provided between the opposing sides of the nose insert 140 and the forward pressure side insert 141 and the nose insert 140 and the forward suction side insert 144.

The central collector passage 152 generally extends along the interior of the central chamber 120 from a forward position to an aft position. Particularly, as shown, the central collector passage 152 begins at the nose insert 140 and extends to a position just forward of the cooling pins 136 and forms a path along the approximate mid-cord line of the airfoil 110, which generally results in a slightly curved channel that follows the general curvature of the airfoil 110. Further, in preferred embodiments, the opposing walls between each pair of inserts that oppose each other across the central collector passage 152 (for example, the middle pressure side insert 142 and the middle suction side insert 145) may be approximately parallel to each other and offset by the width of the central collector passage 152 formed therebetween.

In some preferred embodiments, as shown in FIG. 5, one or both of the two aft inserts, i.e., the aft pressure side insert 143 and the aft suction side insert 146, may have an aft insert extension 158. The aft insert extension 158 generally extends from the aft end of the aft insert 143, 146 in a downstream direction (i.e., toward the trailing edge 118 of the airfoil 110) and connects to the outer wall 133 at a position just forward of the trailing edge of the central chamber 120. Positioned in this manner, the aft insert extension 158 may block the downstream flow of coolant, requiring the coolant instead to take one of the inward bleed channels 150.

In operation, coolant may be directed through the several inserts 140, 141, 142, 143, 144, 145, 146 and, via the insert cooling apertures, impinged. The resulting impingement jet may be directed toward the inner surface of the outer wall 133 such that it convects heat from the outer wall 133 at a relatively high rate. A substantial portion of the post-impingement flow then flows into the inward bleed channels 150. The central collector passage 152 then may collect the post-impingement flow from the inward bleed channels 150 and it may move toward exit points, which, for a substantially amount of the flow, will be the trailing edge cooling apertures 134. In this manner, as one of ordinary skill in the art will appreciate, the degrading effects of post-impingement flow to cooling may be decreased.

FIG. 6 is an illustration of an airfoil 160, an alternative preferred embodiment of the present invention. In general, airfoil 160 may have the same features and configuration as that described above for airfoil 110 of FIG. 5, with the addition of a dividing wall insert 162. The dividing wall insert 162 is a radially extending partition that substantially divides the central chamber 120 from an inner radial position at or near the base of the blade to an outer radial position near the tip of the blade. Axially, the dividing wall insert 162 extends along the mid-cord line from a forward position to an aft position, substantially dividing the hollow airfoil chamber into a pressure side chamber and a suction side chamber.

In some preferred embodiments, the dividing wall insert 162 may originate at a connection made to the outer wall in the forward area of the airfoil chamber. As shown in FIG. 6, the connection may be made on the suction side of the airfoil chamber, just aft of the leading edge 112. In this case, the dividing wall insert 162 may extend toward the mid-cord line of the airfoil 160 and, upon reaching the approximate area of the airfoil mid-cord line, the dividing wall insert 162 may change direction and extend toward the trailing edge 118 of the airfoil 160. In the exemplary embodiment shown, this angle of the direction change may be between approximately 60 to 90 degrees. From the change of direction, the insert dividing wall may extend roughly along the mid-chord line in an aft direction. Extending toward the trailing edge 118, the dividing wall insert 162 may terminate at a position near the aft end of the central chamber 120. Just aft of the termination of the dividing wall insert 162, the two chambers that it divided may be a single chamber.

In operation, the configuration of airfoil 160 may substantially segregate the flow of coolant through the pressure side inserts 140, 141, 142, 143 and the flow of coolant through the suction side inserts 144, 145, 146. As one of ordinary skill in the art will appreciate, the pressure of the coolant flowing through the airfoil must be kept at a sufficient pressure to prevent backflow of the working fluid into the airfoil. More specifically, if the pressure of the coolant within the airfoil is less than that the pressure of the working fluid through the turbine, the working fluid may back flow into the airfoil through, for example, film cooling holes that may be present along the surface of the pressure side 114 and the suction side 116 of the airfoil 160. Because of the extreme temperatures of the working fluid, such back flow may quickly cause significant and costly damage to the airfoil.

As one of ordinary skill in the art will appreciate, because of the shape of the two primary airfoil outer surfaces and the manner in which the working fluid strikes each, the pressure of the working fluid at the outer surface of the outer wall 133 is appreciably higher along the pressure side 114 than it is along the suction side 116 of the airfoil 160. This being the case, efficiencies may be realized by maintaining the internal pressure of the airfoil 160 at different levels. Accordingly, the pressure within the pressure side inserts 140, 141, 142, 143 may be maintained at a higher level than the pressure within the suction side inserts 144, 145, 146, with each being maintained at a level that suitably prevents back flow from occurring through any of the film cooling apertures or other openings (such as cracks) that may be present. As one of ordinary skill in the art will appreciate, the dividing wall insert 162 and conventional methods of delivering and metering the flow of coolant to and through each chamber and the inserts therein may be used to maintain these differing levels of pressure within the two segregated chambers of the central chamber 120.

Achieving an optimized back flow margin in the segregated chambers allows for more effective cooling, i.e., in the case of FIG. 6, the separated suction side of the central chamber 120 may be safely maintained at a lower pressure level. Thusly, the dividing wall insert 162 generally enables separation of pressure side and suction side coolant sources such that optimum pressure and flow-rate can be achieved based on local heat load on the airfoil surface. By improving overall cooling effectiveness, less coolant flow would be required for the same overall heat load on an airfoil, thus improving turbine engine performance through reduced losses and increased output.

FIG. 7 is an illustration of an alternative preferred embodiment of the present invention, an airfoil 170. In general, the airfoil 170 has the same features and configuration as that described above for the airfoil 160 of FIG. 6. The embodiment of FIG. 7 is an example of an embodiment in which several of the inserts are connected via a plurality of radially spaced connectors 172. In general, the connectors 172 are axially and/or circumferentially extending connectors that extend between any of the inserts 140, 141, 142, 143, 144, 145, 146 and/or the dividing wall insert 162. The plurality of connectors that connect two of the inserts and/or the dividing wall insert 162 may occur at different radial heights. In preferred embodiments, the connectors 172 will occur at regular radial intervals between an inner radial position, i.e., a position near the base of the blade, and an outer radial position, i.e., a position near the outer radial tip of the blade. As represented in FIG. 7 by the dotted lines, inward bleed channels 150 may occur between the connectors 172 and function similarly as that described above, though with some volume taken away by the plurality of formed connectors.

The several inserts may be connected to each other via a plurality of connectors 172. (Note, in this situation, the connected inserts may be said to form a single part or a single insert or, similar to the manner in which the inserts are referenced above, still may be said to be a plurality of inserts that are connected.) As shown in FIG. 7, in some embodiments, the pressure side inserts 140, 141, 142, 143 may be connected by the connectors 172. The nose insert 140 may be connected via the connectors 172 to the forward pressure side insert 141, which may be similarly connected to the middle pressure side insert 142, which may be similarly connected to the aft pressure side insert 143. Also, in some embodiments, the suction side inserts 144, 145, 146 may be connected by the connectors 172. In this case, the forward suction side insert 144 may be connected via the connectors 172 to the middle suction side insert 145, which may be similarly connected to the aft suction side insert 146.

The configuration discussed above in relation to FIG. 7 is exemplary. As one of ordinary skill in the art will appreciate, other combinations not shown in FIG. 7 are possible. For example, the nose insert 140 may be connected via the connectors 172 to the forward pressure side insert 141, which may remain unconnected to the middle pressure side insert 142. The middle side insert 142 instead may only be connected to the aft pressure side insert 143. In addition, though not illustrated in FIG. 7, the dividing wall insert 162 may be connected via a plurality of connectors 172 to one or all of the inserts 140, 141, 142, 143, 144, 145, 146, which may or may not be connected to each other. FIGS. 6 illustrates an embodiment wherein the inserts 140, 141, 142, 143, 144, 145, 146 and the dividing wall insert 162 all remain unconnected to neighboring insert structures. As one of ordinary skill in the art will appreciate, the connectors 172 illustrated in FIG. 7 allow for the possibility of connecting all of the insert structures 140, 141, 142, 143, 144, 145, 146, 162. That is, the connectors 172 may be used to connect all the inserts 140, 141, 142, 143, 144, 145, 146 and the dividing wall insert 162 into a single connected structure.

In use, the airfoil 170 may operate similarly as that described above for the other exemplary airfoils, i.e., the airfoil 110 and the airfoil 160. As one of ordinary skill in the art will appreciate, the connectors 172 may have both positive and negative consequences to manufacturing and operation, which may be weighed to determine if the connectors 172 are suitable for a particular application. For example, as mentioned, the connectors 172 generally remove volume from the inward bleed channels 150 and/or, in the case where the dividing wall insert 162 is connected to one of the neighboring inserts, remove volume from the central collector passage 152. While generally this reduction in volume would be a relatively small one, it may result in less post-impingement flow flowing into the inward bleed channels 150 and/or through the central collector passage 152, which, under certain circumstances, may result in a slightly greater level of degrading cross-flow. However, connecting two or more of the inserts 140, 141, 142, 143, 144, 145, 146, 162 into a connected structure may reduce part cost, simplify the manufacturing process and/or part installation. Further, inserts 140, 141, 142, 143, 144, 145, 146, 162 that are connected may better retain proper position within the airfoil during operation.

The inserts 141, 142, 143, 144, 145, 146, the dividing wall insert 162, and the connectors 172 all may be made via conventional means and methods and from any suitable material. The connectors 172 may be formed integrally with the inserts that they connect or may be made as a separate part and later attached.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A turbine blade with a generally hollow airfoil having an outer wall that defines at least one radially extending chamber for receiving the flow of a coolant, the airfoil including a leading edge that resides in an upstream or forward direction, a trailing edge that resides in a downstream or aft direction, a convex suction side, and a concave pressure side, the turbine blade comprising:
    a plurality of inserts disposed within the chamber that are configured to initially receive at least a portion of the coolant entering the chamber and direct a substantial portion of the coolant through a plurality of insert apertures toward the inner surface of the outer wall;
    wherein the inserts are configured to form at least one inward bleed channel and a central collector passage into which the inward bleed channel flows;
    wherein the plurality of inserts includes:
    at least two pressure side inserts that are configured to define at least one inward bleed channel therebetween; and
    at least two suction side inserts that are configured to define at least one inward bleed channel therebetween.

2. The turbine blade of claim 1, wherein:
    the inserts comprise thin-walled radially extending partitions that generally form compartments within the chamber; and
    the turbine blade comprises one of a turbine rotor blade and a turbine stator blade.

3. The turbine blade of claim 1, wherein the at least one inward bleed channel generally comprises a channel that extends from a position near the outer wall of the chamber to a position near the center of the chamber where the inward bleed channel connects to the central collector passage.

4. The turbine blade of claim 3, wherein:
    the central collector passage extends from a forward position in the chamber to an aft position in the chamber roughly along a mid-chord reference line that connects the approximate midpoints between the pressure side and the suction side of the airfoil; and
    the at least one inward bleed channel is oriented in a direction that is roughly perpendicular to the central collector passage.

5. The turbine blade of claim 1, wherein:
    the pressure side inserts include, arranged from a position nearer the leading edge to a position nearer the trailing edge, a forward pressure side insert, a middle pressure side insert, and an aft pressure side insert; and
    the suction side inserts include, arranged from a position nearer the leading edge to a position nearer the trailing edge, a forward suction side insert, a middle suction side insert, and an aft suction side insert;
    further comprising a nose insert that is positioned just forward of the forward suction side insert and the forward pressure side insert.

6. The turbine blade of claim 5, wherein the inward bleed channels are disposed between the nose insert and the forward pressure side insert, the forward pressure side insert and the middle pressure side insert, the middle pressure side insert and the aft pressure side insert, the nose insert and the forward suction side insert, the forward suction side insert and the middle suction side insert, and the middle suction side insert and the aft suction side insert.

7. The turbine blade of claim 1, wherein each insert comprises an outer face that opposes the inner surface of the outer wall through which the insert apertures are formed, and wherein the outer face generally conforms to the contour of the inner surface of the outer wall, but in spaced relation thereto.

8. The turbine blade of claim 1, wherein:
    at least two inserts are disposed on the pressure side of the chamber and define at least one inward bleed channel that begins near outer wall of the pressure side and extends to a position near the center of the chamber;
    at least two inserts are disposed on the suction side of the chamber and define at least one inward bleed channel that begins near outer wall of the suction side and extends to a position near the center of the chamber; and
    the at least two inserts on the pressure side of the chamber and the at least two inserts on the suction side of the chamber are spaced apart such that each opposes the other across the central collector passage.

9. The turbine blade of claim 8, wherein:
    the walls of neighboring inserts that oppose each other across one of the inward bleed channels are approximately parallel; and
    the walls of neighboring inserts that oppose each other across the central collector passage are approximately parallel.

10. The turbine blade of claim 1, wherein:
    at least one of the inserts is positioned near the aft end of the chamber, comprising an aft positioned insert, and includes an aft insert extension;
    the aft insert extension comprises an extension originating from the aft positioned insert that extends in a approximate downstream direction and connects to the inner surface of the outer wall at a position just forward of the trailing edge of the central chamber; and
    the aft insert extension is configured in such a manner that it substantially blocks the aft end of the channel formed between the inner surface of the outer wall and the outer face of the aft positioned insert.

11. The turbine blade of claim 10, wherein:
    the pressure side of the aft end of the chamber includes a first aft positioned insert, wherein the first aft positioned insert includes an aft insert extension; and
    the suction side of the aft end of the chamber includes a second aft positioned insert, wherein the second aft positioned insert includes an aft insert extension.

12. The turbine blade of claim 1, further comprising a dividing wall insert;
    wherein the dividing wall insert is a radially extending partition that substantially divides the chamber from an inner radial position of the airfoil to an outer radial position of the airfoil; and
    wherein the dividing wall insert extends along the approximate center of the chamber from a forward position to an aft position, substantially dividing the chamber into a pressure side chamber and a suction side chamber.

13. The turbine blade of claim 12, wherein the dividing wall insert originates at a connection made with the inner surface of the outer wall in the forward area of the chamber and terminates at a position near the aft end of the chamber.

14. The turbine blade of claim 13, wherein:
    the connection is made on the suction side of the airfoil chamber, just aft of the leading edge;
    from the connection, the dividing wall insert extends across the chamber and, upon reaching the approximate midpoint between the suction side and the pressure side, changes direction and extends in a aft direction along a mid-chord reference line that connects the approximate midpoints between the pressure side and the suction side.

15. The turbine blade of claim 14, wherein the dividing wall insert separates the pressure side inserts from the suction side inserts.

16. The turbine blade of claim 15, wherein the dividing wall insert, the pressure side inserts, and the suction side inserts are configured such that the flow of coolant on the pressure side of the chamber and the flow of coolant on the suction side of the chamber are substantially segregated.

17. The turbine blade of claim 16, wherein the dividing wall insert, the pressure side inserts, and the suction side inserts are configured such that, during operation, the coolant flowing through the pressure side of the chamber generally has a higher pressure than the coolant flowing through the suction side of the chamber.

18. The turbine blade of claim 17, wherein:
the higher pressure of the coolant flowing through the pressure side of the chamber comprises a desired level that adequately prevents backflow of the working fluid into the pressure side of the chamber during operation; and
the lower pressure of the coolant flowing through the suction side of the chamber comprises a desired level that adequately prevents backflow of the working fluid into the suction side of the chamber during operation.

19. The turbine blade of claim 1, wherein:
at least two neighboring inserts are connected by a plurality of connectors;
the connectors generally comprise axially and/or circumferentially extending connections that semi-rigidly or rigidly link neighboring inserts; and
the connectors are positioned at a plurality of different radial heights between the neighboring inserts that the connectors connect.

20. The turbine blade of claim 19, wherein the plurality of inserts includes:
at least two pressure side inserts that are configured to define at least one inward bleed channel therebetween, wherein each of the pressure side inserts is connected to each of the neighboring pressure side inserts via a plurality of the connectors; and
at least two suction side inserts that are configured to define at least one inward bleed channel therebetween, wherein each of the suction side inserts are connected to each of the neighboring suction side inserts via a plurality of the connectors.

21. The turbine blade of claim 20, wherein:
the pressure side inserts include, arranged from a position nearer the leading edge to a position nearer the trailing edge, a forward pressure side insert, a middle pressure side insert, and an aft pressure side insert; and
the suction side inserts include, arranged from a position nearer the leading edge to a position nearer the trailing edge, a forward suction side insert, a middle suction side insert, and an aft suction side insert;
further comprising a nose insert that is positioned just forward of the forward suction side insert and the forward pressure side insert;
wherein the nose insert is connected via a plurality of the connectors to the forward pressure side insert, the forward pressure side insert is connected via a plurality of the connectors to the middle pressure side insert, the middle pressure side insert is connected via a plurality of the connectors to the aft pressure side insert; and
wherein the forward suction side insert is connected via a plurality of the connectors to the middle suction side insert, the middle suction side insert is connected via a plurality of the connectors to the aft suction side insert.

* * * * *